Patented Mar. 8, 1927.

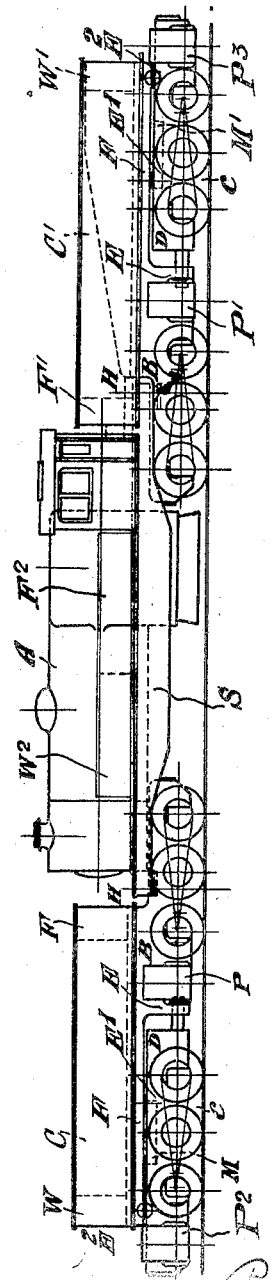

1,620,586

UNITED STATES PATENT OFFICE.

ROBERT HARBEN WHITELEGG, OF MANCHESTER, ENGLAND.

STEAM LOCOMOTIVE.

Application filed October 4, 1924, Serial No. 741,567, and in Great Britain November 23, 1923.

This invention relates to steam locomotives and similar vehicles, and has particular reference to articulated locomotives of the type comprising two power driven units with water and fuel tanks, and a common boiler unit flexibly connected at or near its ends to the said two power driven units, the said boiler being free from the restrictions imposed by driving or carrying wheels and their accessories and by water or fuel tanks placed at the sides of the boiler, thereby allowing the maximum space for the provision of a large boiler of any desired type, with easy access to all parts of the boiler and to all the necessary accessories of the boiler.

The object of this invention is to provide means whereby it will be possible to obtain locomotives of greater power than is at present possible, combined with great facility in the negotiation of curves, maximum weight available for adhesion, and maximum available space for the provision of a large boiler of any desired type.

In existing designs of the known type of locomotive, it is frequently found—as the result of permanent way restrictions—that the maximum limit of power with two power driven units, is reached much before the space available for boiler power is fully occupied. This invention will make possible the provision of a locomotive having power units commensurate with the largest possible boiler. It is also frequently found that carrying wheels or bogies are required to carry the weight which is in excess of that allowed on the driving or coupled wheels. This invention makes possible the use of additional driving or coupled wheels, instead of carrying wheels or bogies, thus providing maximum adhesive weight.

We may, nevertheless, provide carrying wheels or bogies as may be desired.

The principal feature of the present invention lies in providing articulated locomotives of the type referred to above with any number of additional power driven units or groups of coupled driving wheels mounted on frames carrying a steam power translator and transmission mechanism whereby power is transmitted from the power translator to the coupled wheels, these frames being flexibly connected together and the translators thereon supplied with steam from the common boiler.

The framework of each power driven unit carries tanks which may be water and fuel tanks or condensers and will preferably extend over the framework of another unit or power driven group of wheels and be flexibly connected thereto or supported thereon. The water and fuel tanks may advantageously be narrowed, in plan, at the outer ends, in order to reduce overhang on curves. The fuel tank or tanks will preferably be placed at the most convenient part of the power driven unit or boiler unit adjacent to the driver's cab.

Each power driven group of wheels or unit will preferably have its own driving cylinders and mechanism, but we may drive any number of groups or units from one driving source by means of flexible rods, gearing, power transmission and the like.

The cylinders may be compounded for high and low pressures and connected with each other and with the boiler by suitable flexible or rigid pipes and connections.

Any additional groups of wheels or units may be driven by simple or compound turbines if desired, the said turbine or turbines being connected to the driving wheels by means of gearing, rods, flexible connections and the like, or the connection may be made by means of electric, hydraulic, or any other suitable method of power transmission.

The turbines may be "compounded" in any desired method with reciprocating piston engines or other driving source of the units. Some of the groups of wheels or units may be driven by reciprocating piston engines and others by turbines.

We may provide suitable valves and connections for operating or controlling power driven groups of wheels or power driven units, either independently or in any desired combination.

Condensers arranged for use in conjunction with turbines, reciprocating piston engines or any other source of power may be provided and such condensers may be rigidly or flexibly connected to power driven groups of wheels or units as may be desired, or they may be carried on separate vehicles. The turbines and condensers may be of any desired form or system.

The locomotive may be provided at any convenient part with steam-electric, steam-hydraulic, or other suitable form of power generator or converter; and such generator or converter may be suitably connected to supply driving power to any groups of wheels or units. It will be understood that in such case, additional groups of wheels or additional units will not necessarily be directly connected to adjacent groups or units, they may be remote if desired.

Bogie or carrying wheels may be provided on any power driven group of wheels or power driven unit and the size, number and position, as also the size, number, and position of driving or coupled wheels may be as desired.

Any group of wheels or unit may be arranged for use in conjunction with rack rails, centre rails or the like.

Referring to the drawing accompanying this specification Figure 1 shows one embodiment of this invention, but it will be obvious that other embodiments may be obtained without in any way departing from the spirit of the invention.

Figure 1 illustrates generally the preferable arrangement, A, being the boiler unit and B, the power driven units of known type, C indicated additional power driven groups of wheels with frameworks D, flexibly connected in one method to the frameworks of units B, at points E, $E^1$, $E^2$. It will be obvious that other suitable methods of flexibly connecting C to B may be used. F indicates extensions of the frameworks of units B. H indicates the articulating centres between the power driven units and the boiler unit.

P, $P^1$, $P^2$, and $P^3$ indicate power translators in the form of reciprocating piston engines, W and $W^1$ indicate water tanks, F and $F^1$ indicate fuel tanks, C and $C^1$ indicate condensers, M and $M^1$ indicate tanks which may be condensers or water and fuel tanks. $W^2$ indicates a water tank and $F^2$ a fuel tank mounted on a supporting frame S of the boiler unit A.

The provision of any number of additional power driven groups of wheels, or additional power driven units, as also the formation of separate units by dividing the water and fuel tanks as described, will be obvious.

It will be understood that the term "power driven unit" indicates one or more power driven groups of wheels with frameworks, driving mechanisms and the like, and to which is attached as an integral part, water or fuel tanks, or condensers, thus forming a separate unit.

The provision of turbines, condensers and power converters as described will be understood, as will also provision of carrying wheels or bogies.

What I claim and desire to secure by Letters Patent is:—

1. An articulated locomotive having a boiler unit consisting of a boiler mounted upon a frame of which the ends extend beyond the ends of the boiler, two power driven units, and a power driven group of wheels, one of the power units being flexibly connected to the power driven group of wheels and supports and is flexibly connected to one extending portion of the boiler frame, while the other power unit supports and is flexibly connected to the other extending portion of the boiler frame.

2. An articulated locomotive having a boiler unit consisting of a boiler mounted upon a frame of which the ends extend beyond the ends of the boiler, two power driven units and two power groups of wheels, each power unit being flexibly connected to a power driven group of wheels and supports and is flexibly connected to one extending portion of the boiler frame.

3. An articulated locomotive having a boiler unit consisting of a boiler mounted upon a frame of which the ends extend beyond the ends of the boiler, a plurality of power driven units, one of the power driven units being flexibly connected to another and supports and is flexibly connected to one extending portion of the boiler frame, while another power unit supports and is flexibly connected to the other extending portion of the boiler frame.

4. An articulated locomotive having a boiler unit consisting of a boiler mounted upon a frame of which the ends extend beyond the ends of the boiler, a plurality of power driven units, each projecting end of the boiler frame being supported by and flexibly connected to a power driven unit to which is flexibly connected another power driven unit.

5. An articulated locomotive having a boiler unit consisting of a boiler mounted upon a frame of which the ends extend beyond the ends of the boiler, a multiplicity of power driven units and of power driven groups of wheels, one of the projecting ends of the boiler frame being flexibly connected to a power unit flexibly connected to and adjacent to one end of a power driven group of wheels, the other end of the power driven group of wheels being flexibly connected to another power unit, while the other projecting end of the boiler frame is flexibly connected to another power unit.

6. An articulated locomotive having a boiler unit consisting of a boiler mounted upon a frame of which the ends extend beyond the ends of the boiler, a multiplicity of power driven units and of power driven groups of wheels, each projecting end of the boiler frame being flexibly supported on a power driven unit to which is flexibly connected a power driven group of wheels, the power driven group of wheels at one end of the locomotive being flexibly connected at both ends to a power unit.

7. An articulated locomotive having a boiler unit consisting of a boiler mounted upon a frame of which the ends extend beyond the ends of the boiler, a multiplicity of power driven units and of power driven groups of wheels, each projecting end of the boiler frame being flexibly supported on a power unit flexibly connected to one end of a power driven group of wheels, the other end of each power driven group of wheels being flexibly connected to a power driven unit.

8. An articulated locomotive having a boiler unit consisting of a boiler mounted upon a frame of which the ends extend beyond the ends of the boiler, a power driven group of wheels, and two power driven units each having water and fuel tanks and frameworks, one of the power driven units being flexibly connected to the power driven group of wheels and has its water and fuel tanks and framework extending over the power driven group of wheels to which it is flexibly connected, this power driven unit being also flexibly connected to one extending portion of the boiler frame, while the other power driven unit supports and is flexibly connected to the other extending portion of the boiler frame.

9. An articulated locomotive having a boiler unit consisting of a boiler mounted upon a frame of which the ends extend beyond the ends of the boiler, two power driven groups of wheels, and two power driven units each having water and fuel tanks and frameworks, each of the power driven units being flexibly connected to a power driven group of wheels over which its water and fuel tanks and framework extend and to which it is flexibly connected, and each power driven unit being also flexibly connected to one extending portion of the boiler frame.

10. An articulated locomotive having a boiler unit consisting of a boiler mounted upon a frame of which the ends extend beyond the ends of the boiler, a multiplicity of power driven groups of wheels, and a multiplicity of power driven units each having water and fuel tanks and frameworks, one of the power driven units being flexibly connected to a power driven group of wheels over which its water and fuel tanks and framework extend and to which it is flexibly connected adjacent one end, the other end of the group of wheels being flexibly connected to another power unit while the first power unit is flexibly connected to one extending portion of the boiler frame, the other extending portion of the boiler frame being flexibly connected to another power unit.

11. An articulated locomotive having a boiler unit consisting of a boiler mounted upon a frame of which the ends extend beyond the ends of the boiler, a multiplicity of power driven groups of wheels and a multiplicity of power driven units each having water and fuel tanks and frameworks, each projecting end of the boiler frame being flexibly supported over a power driven unit of which the water and fuel tanks and frameworks extend over and is flexibly connected to a power driven group of wheels, the power driven group of wheels at one end of the locomotive being flexibly connected at both ends to a power driven unit.

12. An articulated locomotive having a boiler unit consisting of a boiler mounted upon a frame of which the ends extend beyond the ends of the boiler, a multiplicity of power driven groups of wheels, and multiplicity of power driven units each having water and fuel tanks and frameworks, each projecting end of the boiler frame being flexibly supported over a power driven unit of which the water and fuel tanks and framework extend over and is flexibly connected to a power driven group of wheels, the other end of the power driven group of wheels being also flexibly connected to another power driven unit.

13. An articulated locomotive having a boiler unit consisting of a boiler mounted upon a frame of which the ends extend beyond the ends of the boiler, a power driven group of wheels, and two power driven units each having a condenser and a framework, one of the power driven units being flexibly connected to the power driven group of wheels and has its condenser and framework extending over the power driven group of wheels to which it is flexibly connected, this power driven unit being also flexibly connected to one extending portion of the boiler frame, while the other power driven unit supports and is flexibly connected to the other extending portion of the boiler frame.

14. An articulated locomotive having a boiler unit consisting of a boiler mounted upon a frame of which the ends extend beyond the end of the boilers, a power driven group of wheels, and two power driven units each having a condenser, water and fuel tanks and frameworks, one of the power driven units being flexibly connected to the power driven group of wheels and has its condenser, water and fuel tanks and framework extending over the power driven group of wheels to which it is flexibly connected, this power driven unit being also flexibly connected to one extending portion of the boiler frame, while the other power driven unit supports and is flexibly connected to the other extending portion of the boiler frame.

15. An articulated locomotive having a boiler unit consisting of a boiler mounted upon a frame of which the ends extend beyond the ends of the boiler, a multiplicity of power driven groups of wheels and a multiplicity of power driven units ecah having a condenser and framework, one of the power driven units being flexibly connected to a power driven group of wheels over which its condenser and framework extend and to which it is flexibly connected adjacent one end, the other end of the group of wheels being flexibly connected to another power unit while the first power unit is flexibly connected to one extending portion of the boiler frame, the other extending portion of the boiler frame being flexibly connected to another power unit.

16. An articulated locomotive having a boiler unit consisting of a boiler mounted upon a frame of which the ends extend beyond the ends of the boiler, a multiplicity of power driven groups of wheels, and a multiplicity of power driven units each having a condenser, water and fuel tanks and a framework, one of the power driven units being flexibly connected to a power driven group of wheels over which its condenser, water and fuel tanks and framework extend and to which it is flexibly connected adjacent one end, the other end of the group of wheels being flexibly connected to another power unit while the first power unit is flexibly connected to one extending portion of the boiler frame, the other extending portion of the boiler frame being flexibly connected to another power unit.

17. An articulated locomotive having a boiler unit consisting of a boiler mounted upon a frame of which the ends extend beyond the ends of the boiler, a multiplicity of power driven groups of wheels, and multiplicity of power driven units each having a condenser and a framework, each projecting end of the boiler frame being flexibly supported over a power driven unit of which the condenser and framework extend over and is flexibly connected to a power driven group of wheels, the other end of the power driven group of wheels being also flexibly connected to another power driven unit.

18. An articulated locomotive having a boiler unit consisting of a boiler mounted upon a frame of which the ends extend beyond the ends of the boiler, a multiplicity of power driven groups of wheels, and multiplicity of power driven units each having a condenser, water and fuel tanks and a framework, each projecting end of the boiler frame being flexibly supported over a power driven unit of which the condenser, water and fuel tanks and framework extend over and is flexibly connected to a power driven group of wheels the other end of the power driven group of wheels being also flexibly connected to another power driven unit.

19. An articulated locomotive having a boiler unit consisting of a boiler mounted upon a frame of which the ends extend beyond the ends of the boiler, two power driven groups of wheels, and two power driven units each having a condenser and a framework, each of the power driven units being flexibly connected to a power driven group of wheels over which its condenser and framework extend and to which it is flexibly connected, and each power driven unit being also flexibly connected to one extending portion of the boiler frame.

20. An articulated locomotive having a boiler unit consisting of a boiler mounted upon a frame of which the ends extend beyond the ends of the boiler, two power driven groups of wheels, and two power driven units each having a condenser, water and fuel tanks and a framework, each of the power driven units being flexibly connected to a power driven group of wheels over which its condenser, water and fuel tanks and framework extend and to which it is flexibly connected, and each power driven unit being also flexibly connected to one extending portion of the boiler frame.

21. An articulated locomotive having a boiler unit consisting of a boiler mounted upon a frame of which the ends extend beyond the ends of the boiler, a multiplicity of power driven groups of wheels, and a multiplicity of power driven units each having a condenser and a framework, each projecting end of the boiler frame being flexibly supported over a power driven unit of which the condenser and framework extend over and is flexibly connected to a power driven group of wheels, the power driven group of wheels at one end of the locomotive being flexibly connected at both ends to a power driven unit.

22. An articulated locomotive having a boiler unit consisting of a boiler mounted upon a frame of which the ends extend beyond the ends of the boiler, a multiplicity of power driven groups of wheels and a multiplicity of power driven units each having a condenser, water and fuel tanks and a framework, each projecting end of the boiler frame being flexibly supported over a power driven unit of which the condenser, water and fuel tanks and framework extend over and is flexibly connected to a power driven group of wheels, the power driven group of wheels at one end of the locomotive being flexibly connected at both ends to a power driven unit.

23. An articulated locomotive having a boiler unit consisting of a boiler mounted upon a frame of which the ends extend beyond the ends of the boiler, water and fuel tanks, two power driven units, and a power driven group of wheels, one of the power units being flexibly connected to the power driven group of wheels and supports and is flexibly connected to one extending portion of the boiler frame, while the other power unit supports and is flexibly connected to the other extending portion of the boiler frame, and the water and fuel tanks supported by and above the boiler supporting frame between its extending ends.

24. An articulated locomotive having a boiler unit consisting of a boiler mounted upon a frame of which the ends extend beyond the ends of the boiler, water and fuel tanks, a plurality of power driven units, one of the power driven units being flexibly connected to another and supports and is flexibly connected to one extending portion of the boiler frame, while another power unit supports and is flexibly connected to the other extending portion of the boiler frame, the water and fuel tanks being supported by and above the boiler supporting frame between the boiler frame supporting power units.

25. An articulated locomotive having a boiler unit consisting of a boiler mounted upon a frame of which the ends extend beyond the ends of the boiler, water and fuel tanks, two power driven units and two power driven groups of wheels, each power unit being flexibly connected to a power driven group of wheels and supports and is flexibly connected to one extending portion of the boiler frame, the water and fuel tanks being supported by and above the boiler supporting frame between the power units.

26. An articulated locomotive having a boiler unit consisting of a boiler mounted upon a frame of which the ends extend beyond the ends of the boiler, a plurality of power driven units, water and fuel tanks, each projecting end of the boiler frame being supported by and flexibly connected to a power driven unit to which is flexibly connected another power driven unit, the water and fuel tanks being supported by and above the boiler supporting frame between its supporting power units.

27. An articulated locomotive having a boiler unit consisting of a boiler mounted upon a frame of which the ends extend beyond the ends of the boiler, water and fuel tanks, a multiplicity of power driven units and of power driven groups of wheels, each projecting end of the boiler frame being flexibly supported on a power driven unit to which is flexibly connected a power driven group of wheels, the power driven group of wheels at one end of the locomotive being flexibly connected at both ends to a power unit, the water and fuel tank being supported by and above the frame of the boiler unit.

28. An articulated locomotive having a boiler unit consisting of a boiler mounted upon a frame of which the ends extend beyond the ends of the boiler, water and fuel tanks, a multiplicity of power driven units and of power driven groups of wheels, one of the projecting ends of the boiler frame being flexibly connected to a power unit flexibly connected to and adjacent to one end of a power driven group of wheels, the other end of the power driven group of wheels being flexibly connected to another power unit, while the other projecting end of the boiler frame is flexibly connected to another power unit, the water and fuel tanks being supported by and above the frame of the boiler unit.

29. An articulated locomotive having a boiler unit consisting of a boiler mounted upon a frame of which the ends extend beyond the ends of the boiler, a plurality of frames carrying coupled driving wheels and a steam power translator and power transmission mechanism, one of the frames carrying coupled driving wheels being flexibly connected to another and supports and is flexibly connected to one extending portion of the boiler frame, while another of the frames carrying coupled driving wheels is flexibly connected to the other extending portion of the boiler frame, the steam power translator of each frame being connected to the driving wheels thereof by means of the power transmission mechanism.

30. An articulated locomotive having a boiler unit consisting of a boiler mounted upon a frame of which the ends extend beyond the ends of the boiler, a plurality of frames carrying coupled driving wheels and a steam power translator, and power transmission mechanism, each extending portion of the boiler frame being flexibly supported on a frame carrying coupled driving wheels and flexibly connected to another frame carrying coupled driving wheels, the steam power translator of each frame being connected to the driving wheels thereof by means of the power transmission mechanism.

31. An articulated locomotive having a boiler unit consisting of a boiler mounted upon a frame of which the ends extend beyond the ends of the boiler, a plurality of frames carrying coupled driving wheels, water and fuel tanks, and a steam power translator and power transmission mechanism, one of the frames being flexibly connected to another and supporting and flexibly connected to one extending portion of the boiler frame, while another of the frames is flexibly connected to the other extending portion of the boiler frame, the steam power translator of each frame being connected to the driving wheels thereof by means of power transmission mechanism.

32. An articulated locomotive having a boiler unit consisting of a boiler mounted upon a frame of which the ends extend beyond the ends of the boiler, a plurality of frames carrying coupled driving wheels, a condenser and a steam power translator and power transmission mechanism, one of the frames being flexibly connected to another and supporting and flexibly connected to one extending portion of the boiler frame, while another of the frames is flexibly connected to the other extending portion of the boiler frame, the steam power translator of each frame being connected to the driving wheels thereof by means of power transmission mechanism.

33. An articulated locomotive having a boiler unit consisting of a boiler mounted upon a frame of which the ends extend beyond the ends of the boiler, a plurality of frames carrying water and fuel tanks and condensers and coupled driving wheels and a steam power translator, and power transmission mechanism, each extending portion of the boiler frame being flexibly supported on a frame carrying coupled driving wheels and flexibly connected to another frame carrying coupled driving wheels, the steam power translator of each frame being connected to the driving wheels thereof by means of the power transmission mechanism.

In witness whereof I affix my signature.

ROBERT HARBEN WHITELEGG.